358-86. OR 3,211,830 SR

SEARCH ROOM

Oct. 12, 1965 H. W. SARGENT, JR 3,211,830

PAY TELEVISION SWITCHING APPARATUS

Filed May 1, 1961 4 Sheets-Sheet 1

INVENTOR.
H. W. SARGENT, JR.
BY Townsend and Townsend
ATTORNEYS

PAY TELEVISION SWITCHING APPARATUS

Filed May 1, 1961 4 Sheets-Sheet 2

INVENTOR.
H. W. SARGENT, JR.
BY
Townsend and Townsend
ATTORNEYS

INVENTOR.
H. W. SARGENT, JR

BY
Townsend and Townsend
ATTORNEYS

INVENTOR.
H. W. SARGENT, JR.
BY
Townsend and Townsend
ATTORNEYS 3,211,830
PAY TELEVISION SWITCHING APPARATUS Horace William Sargent, Jr., Little Rock, Ark., assignor, by mesne assignments, to Subscription Television, Inc., New York, N.Y., a corporation of Delaware Filed May 1, 1961, Ser. No. 106,799
1 Claim. (Cl. 178—6)

Figure 1:
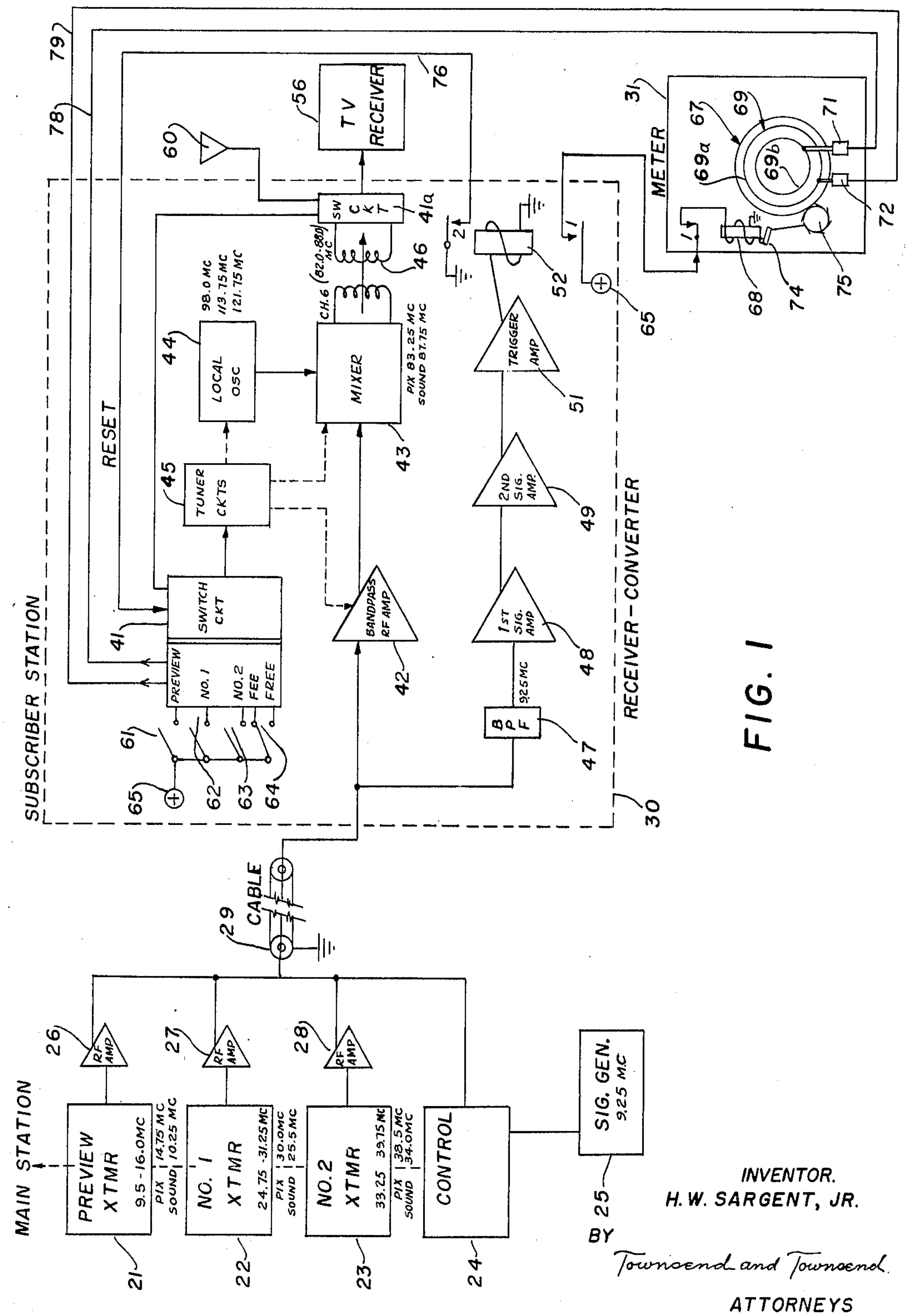

This invention relates to pay television systems and more particularly to a wired pay television system.

The increasing attention being given to pay television systems in the last few years and the advent of a number of ambitious test projects that have been approved by the FCC make it quite clear that widespread interest is present in means and methods for adding pay television channels to the existing free commercial system. Indicative of the interest and activity in this area are numerous publications and patents that are directed to different or alternative systems. The most prominently publicized systems to date are those which use complex electronic circuitry for interleaving the pay TV program carriers between channels assigned for commercial televison broadcating and equally complex circuitry to detect the signals at a subscriber's receiver upon the actuation of a charge signal by manual keying or deposit of coins.

Exemplary of these types of systems is the one proposed by Zenith and described in general terms in the December 1960 issue of Fortune Magazine at page 133. Their so-called Phonevision system garbles broadcasts before transmission and ungarbles them at the receiver. It does so by delaying certain of the scanning lines relative to the horizontal synchronizing pulses. Instead of sending the square waves that are used to break up the picture horizontally, a coded signal, that differs for each program, is sent. Additionally, the audio portion is scrambled by raising the frequency a preselected amount. A decoder at the subscriber's television set responsive to a coded signal unscrambles the pay program, punches a billing tape to coincide with the price for the program and records the information on a magnetic tape inside the decoder.

The disadvantages of non-wire pay television systems have been discussed at length in the literature. Briefly, all require complex electronic components to unscramble the garbled signals. Beyond the circuit complexity required, they have to be carefully tailored to an already overcrowded commercial television spectrum. They must not interfere with the allocated commercial channels nor the intermediate carrier frequencies in the 21–25 mc. and 41–45 mc. ranges that are variously employed in current commercial operations.

Quite aside from the economic disadvantages of the complex circuitry which must be provided at each subscriber's set, certain practical disadvantages are also present. For one thing, in most non-wire systems, the decoder and other subscriber set equipment is located on the subscriber's television receiver and entry to the subscriber's house must be had in order to service or check on the billing information. This causes an inconvenience to the subscriber and should be avoided if possible. Other coded systems rather employ billing tapes that are sent in at the end of the month by the subscriber or are actuated by coins which adds to the inconvenience but still requires periodic inspection. Then too, non-wired systems also reflect the transmission characteristics of free commercial broadcasting, including ghosts, interfering signals, etc. Poor transmission characteristics are not accepted happily by home users in the case of free or commercial televisoin programs, and there will probably be even more objections when the programs are paid for. This being the case, there is much to be said for providing a pay television system which is reliable and which provides top quality transmissions so as to minimize complaints and maintain customer relations at a reasonably good level. Aside from these factors, a practical disadvantage of radio wave transmitted pay television carriers is that approval of the Federal Communications Commission must be obtained. This restricts design freedom and increases the economic cost.

As can be appreciated from the foregoing comments, from a practical design and customer relations standpoint wired pay television systems are definitely superior to RF transmission systems. Wired systems require no FFC. approval and are relatively unaffected by weather and other transmitting difficulties. On the other hand, many previously proposed wire systems, such as that being currently promoted by Paramount Pictures, have certain unique disadvantages of their own. For one thing, the cost of installing an individual transmission link to each subscriber's home has been difficult to overcome economically. The need for service men to periodically collect the monies deposited in the coin demand box inside the subscriber's home also argue against widespread acceptance.

The principal object of the present invention is to provide a pay television system which overcomes the practical and economic difficulties of both the RF transmission and wired transmission systems heretofore developed. Generally speaking, the present invention not only provides an economically competetive pay television system, but does so with relatively simple electronic equipment that is easy to service, easily expanded to a larger number of pay channels and programs, and has maximum security built into it.

The exemplary pay television system constituting the present invention is designed to provide a preview and two pay television programs. The carriers for these three programs are transmitted in distinct bands over a common cable to all subscribers' receivers. The individual decoding and selecting apparatus at each subscriber's station consists basically of a receiver-converter or subscriber system and meter and charging apparatus. The receiver-converter system is attached to the rear of the home receiver whereas the meter is preferably placed on an outside wall of the subscriber's home for ready access by service personnel. The receiver-converter requires only a source of alternating voltage, attachment to the coaxial cable from the main station and to the receiver antenna input terimnals.

The subscriber selects the one of the three channels that he desires to monitor by pressing a push button in the receiver-converter for free viewing and another for the specific pay channel desired. This selects the desired program channel and its carriers and converts them to an empty channel in the tuner of the receiver front end. The particular channel to which it is converted depends upon the local area but channel 6 is used illustratively throughout the following description since it is not assigned for commercial telecasting. If the channel the subscriber has selected is the Preview channel, there is no charge made and the subscriber may obtain information about the programs offered on the two pay television channels, the charges therefor and announcements of future programs that are to be available. If the subscriber then desires to view a program on one of the two pay television channels, he actuates the appropriate push button switch to convert the selected pay channel to exemplary channel 6 in his own receiver tuner for viewing.

This selection also applies a control signal to the meter apparatus attached to the outside of his residence to mark a charge card for subsequent billing. The meter apparatus, which includes a charge card, is controlled from the main station by a signal carrier to advance the charge card for each program change so that unique individual marks are made each time a pay program is selected. The system briefly described above has a number of novel features.

One feature relates to means for previewing the pay television material prior to selecting a program. This permits future programs to be advertised, charges for each program to be indicated, etc.

Another feature of the invention pertains to the means for recycling the system to the preview channel after the end of any pay program which has been selected by a subscriber for viewing so that, upon the next viewing, the subscriber can again obtain information on the forthcoming programs, charges and the like.

Yet another feature of the invention pertains to means for permitting a subscriber to freely switch between a selected fee program and commercial or free television programs without incurring an additional charge. As long as the fee program is still in progress, the subscriber can switch back and forth between it and a free channel without any cost or other additional difficulties.

Yet another feature of the invention pertains to separately locating the meter and charge apparatus exterior to the subscriber's home so that service men need not gain entry to the house to periodically collect billing cards.

Still another feature of the invention pertains to means for preventing accidental operation of a fee channel by requiring a sequence of switches to be actuated. In order to view a fee channel program, it is first necessary to switch the receiver-converter circuit to a fee position and thereafter select a fee channel. This particular feature substantially avoids the possibility of children or other persons accidentally marking the charge card for programs that are not wanted.

Yet another feature of the invention pertains to the means for converting the picture and sound carriers for the preview or fee channels to an available open channel of the tuner of the subscriber's receiver so as to utilize existing equipment and minimize additional electronic components.

Still another feature of the invention pertains to the use of a control signal generator at the main station for controlling the meter and charge apparatus as well as resetting the receiver-converter unit to the preview channel upon the expiration of a fee program that has been selected for viewing.

The present pay television system provides a straightforward and simple answer to the competitive demands of a wired system, yet provides the conveniences and economies which make the service superior to non-wire systems. The receiver-converter of the present system provides a simple and efficient means for permitting selection by a subscriber of one of a number of preview and fee channels transmitted to the subscriber's home over a single cable. By placing the meter and charge apparatus on the outside of the subscriber's home and requiring only a simple attachment of the receiver-converter unit on the back of the subscriber's receiver, it makes it possible to service the apparatus with a minimum of inconvenience. Furthermore, the particular means by which the meter and charge apparatus is synchronized to record the programs selected by a subscriber during the course of a month or other billing period eliminates the inconvenience and complexity of the coin demand systems.

While the present system is described in connection with a preferred embodiment, it should be apparent that variations may be envisioned by those skilled in the art without departing from the spirit and scope of the invention. The claim alone should limit the breadth of the invention, though it is worth-while to note here that while the exemplary system has a preview channel and two fee channels at the main station, it could be expanded to provide additional fee channels if desirable and/or necessary in a given situation. Further, while the receiver-converter unit in the present system illustratively converts the preview and fee channel carriers to the bandwidth of channel 6 (82.0–88.0 mc.), variations in the receiver-converter circuits can be provided to convert the channels to any other channel in the VHF or UHF spectrum.

Figure 2:
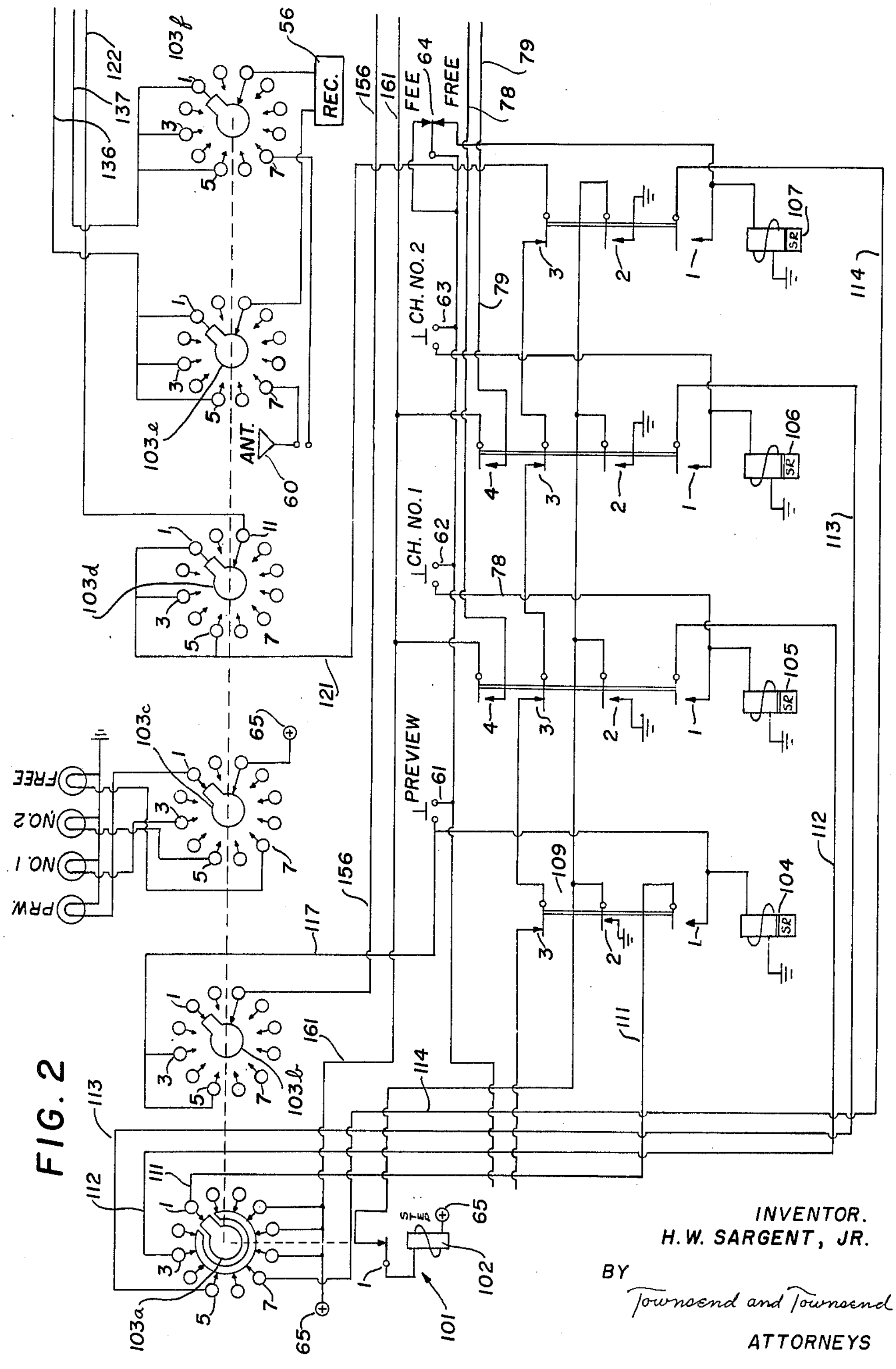
Figure 3:
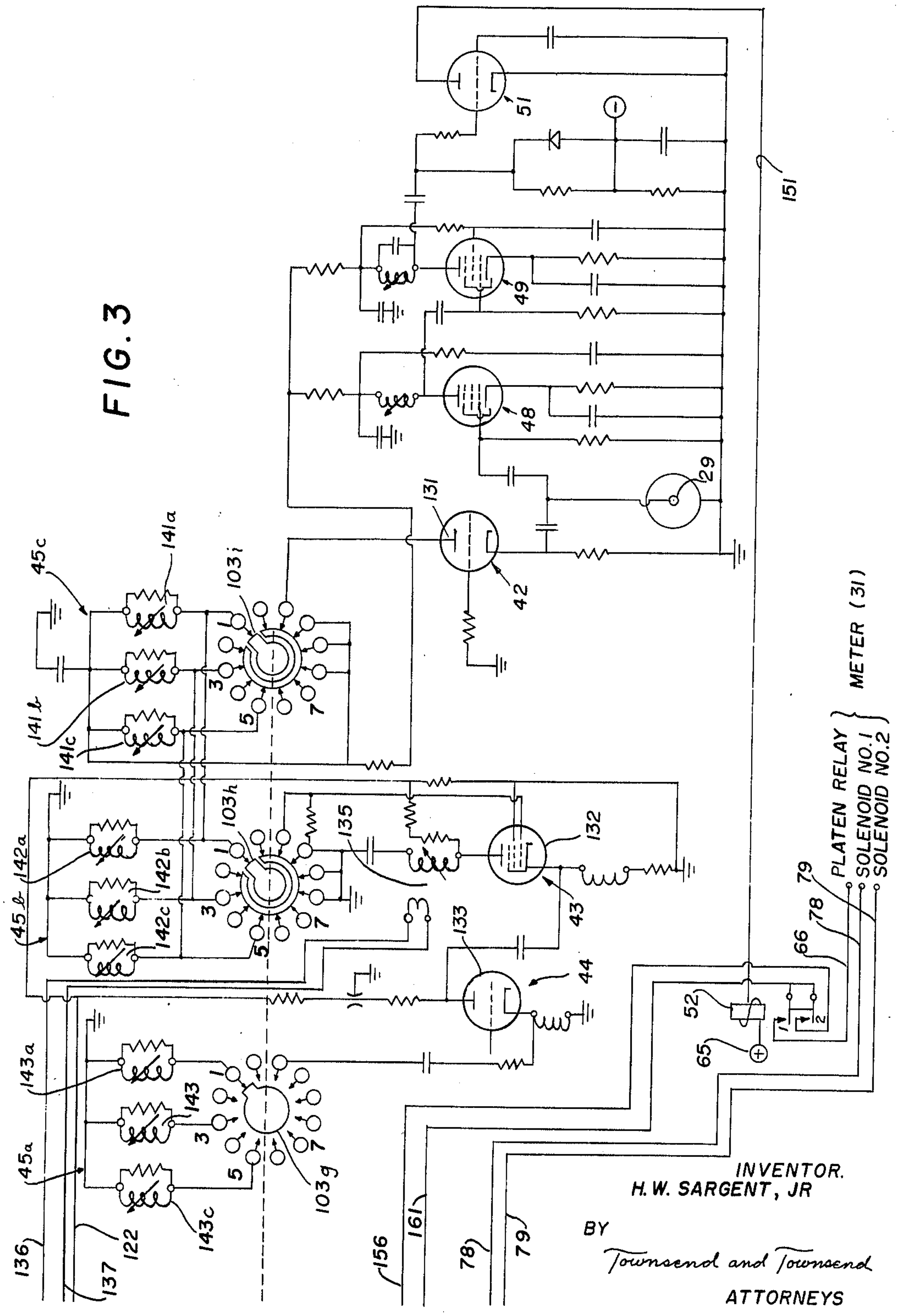
Figure 4:
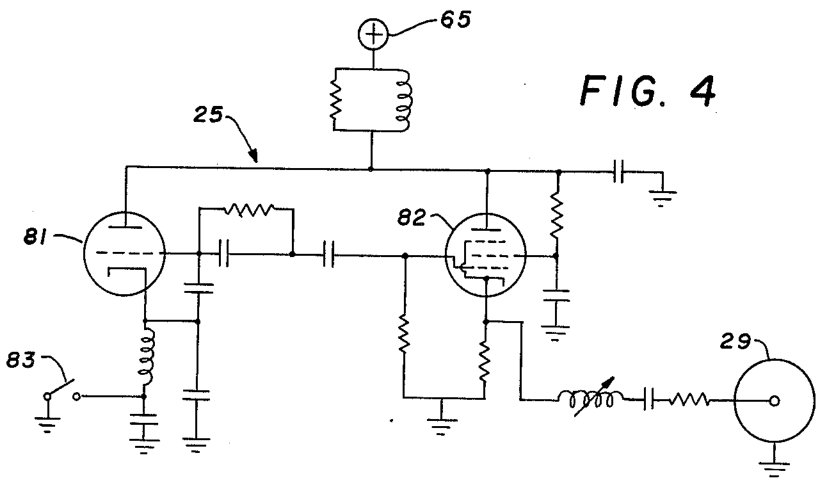
Figure 5:
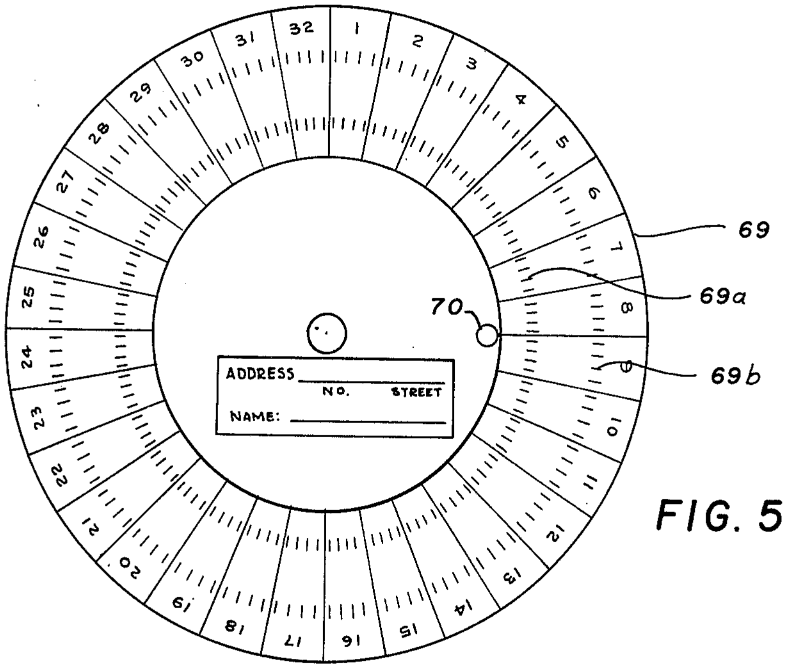

These and other objects, advantages and features of the present invention will be more apparent when the following detailed description is read with reference to the drawings, in which:

FIG. 1 is a block diagram showing the component parts of the pay television system forming the present invention;

FIGS. 2 and 3 when horizontally alined provide a schematic diagram of the receiver-converter which is illustrated by block diagram in FIG. 1;

FIG. 4 is a schematic diagram of the signal generator which is illustrated by block diagram in FIG. 1; and FIG. 5 is a plan view of a charge card for the meter and charge apparatus of FIG. 1.

The pay television system constituting the present invention includes apparatus located at a main station and at the subscriber's home which are connected by a coaxial cable. More particularly, the main station includes a preview transmitter 21, a No. 1 fee channel transmitter 22, a No. 2 fee transmitter 23, a control unit 24, a control signal generator 25, and individual RF amplifiers 26, 27 and 28 for the respective transmitters 21, 22 and 23. The preview channel, pay channels 1 and 2, and transmitters 21, 22 and 23 are connected through their respective RF amplifiers 26, 27 and 28 to the input of coaxial cable 29. The coaxial cable 29 is commonly connected in homes to the input of the receiver-converters 30 which in turn cooperates with individual meter and charging apparatus 31.

In the exemplary embodiment of the main station apparatus herein described, the preview transmitter 21 occupies a bandwidth between 9.5 and 16.0 mc. with a picture carrier of 14.75 mc. and a sound carrier of 10.25 mc.; pay channel 1 transmitter occupies a bandwidth between 24.75 and 31.25 mc. with a picture carrier of 30.0 mc. and a sound carrier of 25.5 mc.; and pay channel 2 transmitter is transmitted in a band width between 33.25 and 39.75 mc. with a picture carrier 38.5 mc. and a sound carrier of 34.0 mc. These particular bandwidths are chosen to avoid interference with the intermediate frequency carriers in the 21–25 mc. and 41–45 mc. range. Further, the selection of the particular picture and sound carriers accord with the vestigal side band transmission that is standard for commercial or free telecasting transmission. The picture and sound carriers are commoned to the input of the cable 29 through their respective RF amplifiers. These isolate and amplify the signals of the transmitters.

In addition to the particular exemplarily employed frequency bands there is provided a 9.25 mc. unmodulated carrier control signal. This is also connected to the input of cable 29. It should be apparent that other frequency bandwidths might have been selected for transmitters 21, 22 and 23 and that a different frequency might be chosen for the signal generator 25. These particular combinations have worked well in practice and seem to provide sufficient separation to minimize interference with the subscriber's television circuits and with each other. Of course, harmonic interference with the commercial RF carriers is no problem since the cable can be properly shielded from external energy.

The 9.25 mc. control carrier along with the picture and sound carriers for the programs broadcast by transmitters 21, 22 and 23 are transmitted by way of a cable 29 to the input of the receiver-converter 30. The receiver-converter 30 functionally includes a switching circuit 41, a band pass RF amplifier 42, a converter or mixer circuit 43, a local oscillator circuit 44, a series of tuned circuits 45, an IF transformer 46, a band pass filter 47, first and second signal amplifiers 48 and 49, a trigger amplifier 51, a control relay 52, and a power supply (not shown) for the various filaments, B+ and relay control switching signals.

The picture and sound carriers for each channel and the signal carrier are connected by way of cable 29 to the common input of band pass RF amplifier 42 and band pass filter 47. Depending upon the connections in switching circuit 41, as determined by subscriber's setting, the picture and sound carriers transmitted by one of the three transmitters 21–23 is applied to the input of mixer 43 and an appropriate oscillator frequency, provided by local oscillator 44, beats the picture and sound carrier of the selected channel. The output of mixer 43 in all cases is a band between 82.0–88.0 mc. corresponding to commercial channel 6. Within these limits, the picture carrier applied to the input of IF transformer 46 is 83.25 mc. and the sound carrier is 87.75 mc. The output winding of transformer 46 is applied through a portion of switching circuit 41 (which is designated **41*a* in FIG. 1) to the subscriber's receiver identified as 56**.

The selection of program is determined by the initial closure of one of the four switches 61, 62, 63 or 64 of the switching circuit 41. Switch 64 is a two position switch which will remain in one or the other position whereas 61, 62 and 63 are push button switches. If a subscriber desires to monitor commercial channels, switch 64 is operated to the FREE side to connect a source of power 65 to the switching circuit 41. This causes the switching circuit **41*a* to connect antenna 60 directly to the TV receiver 56 so that the receiver tuner in a conventional manner may receive a commercial channel picture and sound carriers and reproduce the program on the receiver tube. On the other hand, if the subscriber desires to consider fee programs, the switch 64 is changed to the FEE position. Additionally, if preview channel is to be monitored to see what is being offered, etc., switch 61 is closed temporarily which causes the switching circuit 41 to connect appropriate tuned circuits of 45 into the RF bandpass amplifier 42, local oscillator 44 and mixer 43 circuits as well as to disconnect the antenna 60 from the receiver 56**.

With the picture and sound carrier frequencies employed for the preview program channel, this selection causes switching circuit 41 to switch a filter network into the amplifier 42 which will pass only the band between 9.5–16.0 mc. It also selects a tank circuit for local oscillator 44 to provide a 98.0 mc. frequency. This in combination with the output from amplifier 42 is applied to mixer 43 to provide the output picture and sound carriers for commercial channel 6. This output is thereafter, as noted above, applied to IF transformer 46 and through switching circuit **41*a* to the receiver 56**.

If after viewing the preview channel, the subscriber desires to watch pay channel 1, he temporarily closes switch 62 which causes switching circuit 41 to change the tuned circuits 45 associated with amplifier 42, mixer 43, and local oscillator 44. The changes are designed to permit band pass RF amplifier 42 to pass only the band between 24.75–31.25 mc. (channel 1) and to change the local oscillator frequency to 113.25 mc. so that the output from the mixer 43 will still coincide with commercial channel 6. This having been done, pay channel 1 is applied through switching circuit **41*a* to channel 6 of receiver 56 and tuned in just as a commercial channel would be tuned. In addition to switching the tuned circuits 45, the switching circuit 41 applies a marking pulse by way of lead 78 to a solenoid 71 associated with the meter and charging apparatus 31. Solenoid 71 in operating provides a mark on a charge card 69** as illustrated in FIG. 5 indicating the selection of channel 1 by the subscriber.

In a similar fashion, if the subscriber had selected channel 2 by closing switch 63, switching circuit 41 controls tuned circuits 45 to switch the band pass filter for amplifier 42 to one between 33.25–39.75 mc. and change the beat frequency to 121.75 mc. The result is that the output of mixer 43 will again be the picture and sound carriers corresponding to commercial channel 6 to which the TV 56 is tuned. The switching circuit 41 provides a signal over lead 79 which is applied to a second solenoid 72 in the meter apparatus 31 to cause it to punch the charge card 69 to indicate that the subscriber has selected pay channel 2.

Before describing the way in which the meter apparatus 31 is controlled from the main station and the way in which the receiver-converter circuit 30 is reset to the preview channel following a pay program selection, it is necessary to briefly understand the working of meter apparatus 31. Meter 31 includes a circular platen 67 rotatably supported by a ratchet mechanism 75. The platen is designed to be advanced 2.8125 degrees upon each actuation of a stepping relay 68. Thus 128 unit steps for a platen 67 constitute a complete revolution of 360 degrees. Supported on the platen 67 is a charge card 69 which is illustrated in more detail in FIG. 5. As can be observed there, the card 69 is angularly divided into 128 segments. The segments are marked off around two circular arcs at different radii, **69*a*, 69*b*, the innermost lying directly beneath the plunger of solenoid 71 which is associated with channel 1 and the other directly beneath the plunger of solenoid 72 which is associated with pay channel 2. Whenever one or the other of solenoids 71 and 72 is actuated, its plunger descends and perforates the card along the associated circle 69*a* or 69*b*** to record the fact that a selection has been made for that pay channel.

The stepping switch 68 is operated by control relay 52 which in turn is actuated by the presence of a 9.25 mc. control signal from signal generator 25. The latter is applied by way of cable 29 to the input of band pass amplifier 42 and band pass filter 47. As long as the synchronizing signal from signal generator 25 is applied by way of cable 29 to the receiver-converter 30, the stepping relay 68 continues to operate and release thereby moving the platen 67 one unit of approximately 2.8 degrees for each operation. Band pass filter 47 passes the 9.25 mc. signal that appears on cable 29 and attenuates the picture and sound carriers also commoned over the cable. The 9.25 mc. signal passes through first and second signal amplifiers 48 and 49 and trigger amplifier 51. The output of trigger amplifier 51 completes a circuit for control relay 52 causing it to operate. It will remain operated until the control signal is removed from cable 29.

As long as control relay 52 is operated, a source of power 65 is applied by way of its front contact 1 and lead 66 to the armature of stepping relay 68. This completes a circuit for relay 68 through a back contact 1 thereof which is broken each time the relay armature 74 closes. The armature 74 in closing rotates ratchet 75 to step the platen 67 and the indexed card 69 one angular unit. Control relay 52 in operating also applies ground by way of its front contact 2 and lead 76 to the switching circuit 41 for resetting the receiver-converter 30 to the preview position if it had previously been on either channel 1 or 2 as will be explained in more detail below.

The meter and charging apparatus 31 is only exemplarily illustrated in FIG. 1 although the format of the charge card is shown in detail in FIG.5. For understanding of the present system application of this is deemed sufficient, however an application filed on an even date herewith (S.N. 106,800, filed May 1, 1961) discloses and claims the meter apparatus. It is suggested that this copending application be considered for more details of construction of the meter 31.

The foregoing description of the main station and subscriber station equipment makes it apparent that the subscriber station equipment meets the basic requirements of a good pay television system, and in fact is the only one known to date which does so. The multi-channel information is supplied to the receiver-converter by way of a cable where, depending upon the subscriber's wishes, one of the three channels or the free or commercial channels can be selected and connected to the subscriber's regular receiver for viewing. Means are provided to simply and effectively switch the receiver-converter to monitor one of the two pay channels and mark a card, the relative position of which is synchronized with control means at the main station so billing may be subsequently determined. The system offers maximum security inasmuch as it uses a separate cable connected to each subscriber's home. It permits the recording of the programs purchased. Multiple pricing and payment therefor is a simple matter. The system also provides multiple channels for program material; there are no internal connections to the customer's TV set, an important consideration in any practical system); it passes NARB standards and color programs without difficulty; it is small in size, pleasing in appearance and economical in cost and installation; and, finally, the pricing and billing information is available for service personnel outside the subscriber's home, which minimizes the inconvenience and irritations accompanying even wired systems that have coin demand boxes attached to the subscriber's receiver.

While the overall operation of the system is illustrated in FIG. 1, FIGS. 2 and 3 when arranged in side by side position illustrate the circuitry of the receiver-converter in detail and FIG. 4 is a schematic diagram of the signal carrier oscillator circuit.

Before considering the receiver-converter circuit in detail, consider the signal generator 25 (FIG. 4). The generator 25 includes a cathode tuned oscillator tube 81, cathode follower output tube 82, a source of $B^+$ 65 and the various associated circuit components. Closure of switch 83 causes the generator 25 to generate a 9.25 mc. unmodulated carrier. It is amplified and connected to the cable 29 as shown. Control of the meter 31, etc., is effected by operation of the switch 83.

The receiver-converter circuit 30 as illustrated in combined FIGS. 2 and 3 and more particularly the switching circuit 41 thereof includes a stepping relay or switch 101 that comprises a relay coil 102 and nine multi-position wafer sections **103*a*–103*i*, the four switches 61–64 and slow release relays 104, 105, 106 and 107, which are respectively associated with the selector switches 61–64. The wafers 103*a*–103*i* are associated with various parts of the receiver-converter 30 in order to provide the necessary switching functions for resetting channels 1 and 2 to the preview channels after the termination of a subscription program which the subscriber has viewed (103*b*), visually indicating the channel in use at any one time (103*c*), establishing a closed path for $B^+$ to the local oscillator 44 only after a switch has been actuated (103*d*), switching the antenna and pay television channels as provided by auxiliary switching circuit 41*a* in the FIG. 1 block diagram (103*e* and 103*f*), and switching the proper tuned circuits into cooperative relationship with the mixer 43, the local oscillator 44 and the band pass RF amplifier 42 (103*g–i***).

Before considering precisely how the stepping relay 101 controls the various components of the receiver-converter 30, it is well to understand the means by which it is caused to step in response to the actuation of one of the selectors 61–64. Looking to the lower part of FIG. 2, it will be observed that a source of $B^+$ 65 is connected to the armature of switch 64 (free channel selector) and one contact is connected to a line commoned to one terminal of push button switches 61–63 while the other contact is connected to the high side of the coil of relay 107. The common line of these switches 61–63 is connected to the high side of their respective relays 104, 105 and 106. It will also be observed that armatures of each relay 104, 105, 106 and 107 are commoned through a lead 109 to back contact 1 associated with stepping relay coil 102. Inasmuch as front contacts 2 of all four relays 104–107 are connected to ground, every time any one of the four relays is operated, a path is closed from ground by way of lead 109 through back contact 1 of stepping switch 101 and the coil 102 to a source of $B^+$ 65. This causes stepping switch 101 to operate which in turn advances the armatures or wipers associated with wafer switches **103*a*–103*i* one terminal each time it operates. Because the circuit is closed through back contact 1 of stepping relay 101, the stepping switch buzzes. The circuit is broken each time the relay operates. Once the circuit path for the stepping switch 101 is closed, it will continue to operate and release until the position corresponding to the actuated switch is reached by the wafer armatures. This is determined by wafer segment 103*a*. A lock up path over front contact 1 of relay 104 and lead 111 connected to terminal 1 of wafer 103*a* is provided; a lock up path over front contact 1 of relay 105 and lead 112 to terminal 3 of switch wafer 103*a* is provided; a lock up path over front contact 106 and lead 113 to terminal 5 of wafer 103*a* is provided; and a lock up path over front contact 1 of relay 107 and lead 114 connected to terminal 7 of wafer 103*a* is provided. A source of power 65 is commoned through terminals 8, 9 and 10 of wafer 103*a* to apply power through the armature or wiper of wafer 103*a* as long as the armature contacts the ring of the wafer. However, when the armature steps to the position exemplarily indicated in FIG. 2, the path to battery 65 is interrupted and, when selector switch 61 is also open, causes relay 104 to slowly release. In a similar fashion, relays 105, 106 and 107 have hold paths associated with their respective terminals 3, 5 and 7 of the wafer 103*a* which paths are closed until the armature moves out of contact with the instant terminal on wafer 103*a* which corresponds to the channel selected by the operation of switch 61, 62, 63 or 64**.

The stepping relay 101 upon the actuation of one of the four selector switches 61, 62, 63 or 64, which switches correspond to the preview, pay channel 1, pay channel 2, and free channels, respectively, rotates the armatures of wafer sections **103*a*–103*i* to the terminal positions corresponding to the selected channel. In the case of the preview channel, the armatures of switch wafers 103*a*–103*i* step to terminals 1. For pay channels 1, 2 and the free channel, the terminal positions are 3, 5 and 7, respectively. These four terminal positions on the wafers are consistent through all nine wafer sections and hence act to permit setting the entire receiver-converter circuit 30** in accordance with the subscriber's programming wishes.

Wafer section **103*b* permits pay channels 1 and 2 to be reset to the preview channel by commoning, over lead 117, terminals 3 and 5 of that wafer to the high side of relay 104, which is associated with the preview channel. Whenever the armature of wafer section 103*b* contacts terminals 3 or 5, battery 65 is connected by way of lead 117 to the front contact 2 of the trigger relay 52. Operation of relay 52 completes a circuit for relay 104 in the preview channel. This causes the stepping relay 101 to step to the preview channel position (wafer terminals 1). It will be remembered that the system is recycled to the preview channel by operating trigger relay 52** from the master or main station with the 9.25 mc. carrier signal.

Wafer section **103*c* provides a visual indication of the channel selected. Terminals 1, 3, 5 and 7 are individually connected through neon lights to ground and a source of $B^+$ 65** is connected to the armature of the section. The result is that a light unique to the selected channel is lighted each time a channel is selected.

Switch wafer **103*d* is arranged to connect a source of $B^+$ 65 through serially connected back contacts 3 of each one of relays 104, 105, 106 and 107 to the tubes in the receiver-converter 30. More particularly, battery 65 is applied serially through back contact 3 of the relays by way of lead 121 to terminals 1, 3 and 5 of wafer 103*d*, and through a shorting contact at switch position 11 over lead 122** to the receiver-converter tubes.

Before considering the details of the switching that occurs in the RF amplifier 42, mixer circuit 43 and local oscillator circuit 44, it is well to briefly consider the principal components of these circuits that are exemplarily illustrated in block diagram form in FIG. 1. Bandpass RF amplifier 42 includes a triode vacuum tube 131 with its related circuitry including three tuned plate circuits illustrated generally at 45c. The mixer circuit 43 includes tetrode 132 and three tuned R-L circuits generally indicated at 45b. And local oscillator circuit 44 includes a vacuum tube 133 and three tuned R-L circuits generally illustrated at 45a. The output from the mixer across transformer 135 is connected to leads 136 and 137 which are connected to commoned terminals 1, 3 and 5 of the switch sections 103e and 103f.

The particular position of the stepping relay 101, which in turn determines the positioning of switches 103e and 103f, applies the output from the mixer 43 across the input to the TV receiver 56 if the preview channel or pay channels 1 or 2 are in use. Alternatively, if switch 64 has been switched to the FREE position, receiver 56 is connected directly to the antenna 60.

The picture and sound carriers for the preview and pay channels 1 and 2 are commoned and transmitted to the subscriber station over cable 29 to the cathode of tube 131 in the bandpass RF amplifier. If the preview channel switch 61 has been depressed the tuned circuit 141a corresponding to the picture and sound carriers for the preview bandwidth, is connected in the plate circuit of tube 131 through switch wafer 103i thereby permitting the preview carriers to be amplified. The amplified signal is fed from the plate of tube 131 through switch wafer 103h to the grid of the mixer tube 132. The selection of the preview channel also switches the tuned circuit 142a associated therewith across the input to the mixer. In addition, due to the instant position of stepping switch 101, the tuned circuit 143a associated with the preview channel band width is connected to the grid of the oscillator tube 132 that beats the picture and sound carriers of the preview channel. The demodulated output of mixer 43, which is a picture and sound carrier corresponding to channel 6 of the receiver's tuner, is connected through transformer 135 to the receiver 56.

In a similar manner, if pay channel 1 or 2 is selected, rather than the preview channel, the appropriate set of R-L circuits, 141b, 142b and 143b in the case of pay channel 1 and 141c, 142c and 143c in the case of pay channel 2 are connected into their appropriate circuits to pass only the frequencies of the instant selected channel as well as to select the proper beat frequency, as mentioned in connection with the block diagram of FIG. 1.

It will be remembered that switch section 103d is designed to connect B+ to the receiver-converter tubes when any one of the preview or pay channels 1 or 2 are selected for viewing. B+ is connected by way of lead 122 to the plate of local oscillator tube 133, and to the plate suppressor grid of mixer tube 132. This prevents a conversion of the incoming signals until the stepping relay comes to rest on the terminals corresponding to the selected channel.

The foregoing explanation fully describes the operation of the receiver-converter circuit 30 insofar as its initiation by a subscriber is concerned. The next consideration is how this operation is controlled or otherwise modified by external control originating at the main station by way of the 9.25 mc. carrier impressed on the cable 29 along with the picture and sound carriers for the three program channels. Whenever a 9.25 mc. control carrier, generated by the circuit of FIG. 4, is impressed upon cable 29, it is applied to the grid of the pentode constituting the first signal amplifier 48 which in turn connects it through an appropriate coupling capacitor to the grid of the pentode forming the second signal amplifier 49. The output from amplifier 49 is connected to the trigger amplifier 51 in the form of a triode and the output from trigger amplifier 51 is connected by way of lead 151 to one side of the winding of control relay 52. The other side of the winding of relay 52 is connected to a soruce of B+ 65 so that relay 52 operates each time an output is detected at the plate of trigger amplifier 51. It might also be noted in this connection that appropriately tuned circuits are placed in the plates of the first and second signal amplifiers 48 and 49 in order to pass only the 9.25 mc. carrier. The two stage amplifier is used for the unmodulated carrier signal to prevent a highly negative picture from spilling spurious 10 mc. signals into the signal carrier channel and thereafter accidentally operating relay 52.

It will be remembered from the preceding discussion that each time relay 52 is operated it closes a path from B+ 65 over its front contact 1 and lead 66 to the platen relay 68. Relay 52 in operating also applies battery 65 by way of front contact 2 and lead 76 to terminals 3 and 5 of switch section 103b as previously explained. This provides a means for recycling the pay television system from pay channels 1 and 2 to the preview channel by a signal originating at the main station.

The B+ source of 65 is commonly connected to the armatures of relays 105 and 106 to cooperate with front contacts 4 of these relays as well as both armatures of control relay 52. Whenever switch 62 is depressed to enable channel 1, battery 65 is applied by way of lead 161 and front contact 4 of relay 105 to lead 78 which in turn acts to enable solenoid 71 in the meter apparatus 31. Similarly, whenever switch 63 is closed to enable channel 2, battery 65 is applied by way of lead 161 and front contact 4 of relay 106 and lead 79 to energize solenoid 72 of the meter and charging apparatus 31. These latter connections provide the paths for energizing the marking solenoids 71 and 72 that provide a permanent record of the programs selected by a subscriber for viewing.

Now that the various features of the present receiver-converter circuit 30 have been described in detail, a systematic explanation of the operation of the system may be set forth. To utilize the pay television features, a subscriber turns on his television receiver 56 and sets the tuner to channel 6. Then, if he wishes to monitor the preview channel, he will place switch 64 on FEE, depress preview channel switch 61 to operate relay 104 and complete a circuit for stepping relay 101. It operates and releases until the lock up path over front contact 1 of relay 104 is interrupted by the instant location of the armature of wafer switch of 103a (by terminal 1). At the time the stepping switch 101 stops, all nine wafer switches 103a–103i are set to terminal 1 which is indiacted by a lamp associated with terminal 1 of switch section 103c. At this position, B+ is applied to the local oscillator, mixer and band pass RF amplifier and the circuits 141a, 142a and 143a are switched into the appropriate sections of the oscillator, mixer and amplifier. With these switching connections made, the preview channel picture and sound carriers are applied to the cathode of RF amplifier 42 by way of cable 29, passed through to the output transformer 135, and thereafter applied through switch sections 103e and 103f to the antenna input on the subscriber's receiver 56. It may then be viewed on channel 6 for information on programs, coming events, prices, etc.

After observing the preview channel, if the subscriber desires to pay for and watch a program on pay channel 1, for example, he depresses switch 62 to step stepping relay 101 to place the wipers of switch sections 103a–103i on terminals 3. This appropriately switches the necessary circuits and provides a visual indication by way of switch section 103c of the instant pay channel selected. The closure of switch 62 in addition to establishing the necessary tuned circuits for the channel 1 picture and sound carriers also closes a circuit over lead 78 to solenoid 71 in the meter apparatus 31. The latter punches the innermost circle 69a on the charge card 69. The closure of switch 62 also causes a timing meter (not shown) to start timing 3½ hours to maintain the pay channel 1 program on channel 6 of the subscriber's receiver 56. At the end of the 3½ hour period if the program is still continuing, the subscriber merely reactivates switch 62 to continue the viewing. No new hole is punched in the charge card 69.

As soon as the program which the subscriber viewed is over, a carrier signal from the main station (generator 25) is generated and transmitted over cable 29, detected, amplified and connected to the winding of control relay 52. This places battery 65 on lead 66 thereby operating the platen advance relay 68 with the result that the turntable or platen supporting the charge card is rotated one angular unit at a time. The control carrier can also operate control relay 52 by way of switch section 103*b* to recycle the system to the preview channel where it remains until the subscriber selects another program or switches switch 64 to the FREE position.

The operation of the pay channel 2 is similar to that of pay channel 1 upon the closure of its switch 63.

If the subscriber prefers to watch free TV, he selects whatever commercial channel is available and closes the switch 64 to the FREE position. This position only connects the receiver 56 to antenna 60 thereby completely bypassing the pay television portion of the system.

The pay television system herein described is a system for metering and billing wired television programs. It provides three program sources simultaneously broadcast from a main or central studio. The frequency bandwidths are selected below those used in standard television broadcasting and in such a way as to not interfere with the intermediate carriers currently employed in commercial broadcasting. One of the three channels is used to preview the programs and provide general information on billing charges, etc., while the other two provide pay television channels. When one is selected for viewing, a solenoid is operated to mark a charge card for use in billing at the end of a period. The receiver-converter for the three channels along with the switching apparatus is included in a cabinet supported on the back of the television receiver while the meter and charging apparatus is mounted outside of the house for ready access by service personnel.

During operation, the subscriber is free to change to a free television channel, turn the set off, and/or reactuate the pay channel originally selected—all without additional charge. Even if the program selected exceeds the 3½ hour period, the subscriber need only reactuate the solenoid to continue the program because the card has not been advanced by operation of the platen relay.

Whenever a program is changed, the signal carrier is generated at the studio or main station and transmitted to the individual receivers. This signal operates the platen relay to rotate the ratchet mechanism and card a little less than 3°.

The arrangement assures a versatile and reasonably priced pay television system easily integratable into a free television system.

The instant pay television system meets all of the requirements which should be ideally provided in pay systems. As previously pointed out, it provides security, simplicity in operation and removal of servicing and bill collecting information from the subscriber's set. Furthermore, it does not interfere with free broadcast systems, requires no internal connections to the subscriber's receiver and avoids the substantial problems present in any system that employs non-interfering radio waves.

What is claimed is:

A subscription television system compatible with regular television programming and designed to use conventional home receivers for video and sound reproduction comprising, in comibnation, a main station including a plurality of transmitters for converting subscription programs to unique carrier frequencies and means for generating a unique control signal frequency; one or more subscriber stations disposed at locations remote from said main station; a common cable connecting said main station transmitters to all of said subscriber stations; each one of said subscriber stations comprising in addition to a home television receiver, a charge meter, switching means operable by a subscriber to select for viewing among one of the pay programs and free programs, converter means responsive to the selection of a specific pay program to convert the carrier frequencies therefor on said common cable to the carrier frequencies of an open channel in said receiver; means for connecting said control signal generating means to said cable only at the start of each new program; means at each subscriber station responsive to said control signal to cause said meter to assume a unique position for each new program, and means responsive to the selection of at least certain ones of said pay programs to cause said meter to permanently record the event of the selection of the instant program for viewing, said switching means including a manual switch operable by a subscriber for each subscription program channel and to select between free and fee programs, a channel relay associated with each one of said switches which is operated by the closure of its associated switch, a stepping switch having a plurality of segmented switch elements responsive to the operation of any one of said relays to rotate the armatures for said switch elements to positions corresponding to the instant channel selected; and wherein the circuit for the meter recording means includes the channel relay associated with the subscription program selected for viewing.

References Cited by the Examiner

UNITED STATES PATENTS

| | | | |
|---|---|---|---|
| 2,607,846 | 8/52 | Hubbard | 178—6 |
| 2,854,506 | 9/58 | Pickles | 178—5.1 |
| 3,021,383 | 2/62 | Mountjoy | 178—5.1 |
| 3,051,775 | 8/62 | Novak et al. | 178—5.1 |
| 3,071,642 | 1/63 | Mountjoy et al. | 178—5.1 |

OTHER REFERENCES

Ridenour et al.: Fundamental Problems of Subscription Television: The Logical Organization of the Telemeter System, Journal of the SMPTE, August 1953, page 188.

DAVID G. REDINBAUGH, *Primary Examiner.*

ELI J. SAX, *Examiner.*